(12) United States Patent
Chen et al.

(10) Patent No.: US 10,494,290 B2
(45) Date of Patent: Dec. 3, 2019

(54) DUAL-AIRY-BEAM SYSTEMS AND METHODS FOR PROCESSING GLASS SUBSTRATES

(71) Applicant: Corning Incorporated, Corning, NY (US)

(72) Inventors: Minghan Chen, Saint Johns, FL (US); Ming-Jun Li, Horseheads, NY (US); Anping Liu, Horseheads, NY (US); Gaozhu Peng, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 47 days.

(21) Appl. No.: 15/404,677

(22) Filed: Jan. 12, 2017

(65) Prior Publication Data

US 2017/0203994 A1 Jul. 20, 2017

Related U.S. Application Data

(60) Provisional application No. 62/278,657, filed on Jan. 14, 2016.

(51) Int. Cl.
*C03B 33/09* (2006.01)
*B23K 26/402* (2014.01)
(Continued)

(52) U.S. Cl.
CPC ........ *C03B 33/093* (2013.01); *B23K 26/0608* (2013.01); *B23K 26/354* (2015.10);
(Continued)

(58) Field of Classification Search
CPC . C03B 33/093; C03B 33/0222; C03B 33/102; B23K 26/354; B23K 26/53; B23K 26/0608; B23K 26/402; B23K 2103/54
See application file for complete search history.

(56) References Cited

U.S. PATENT DOCUMENTS

| 5,164,565 A | 11/1992 | Addiego et al. |
| 2009/0078366 A1 | 3/2009 | Endo et al. |

(Continued)

FOREIGN PATENT DOCUMENTS

| CN | 101797666 A | 8/2010 |
| EP | 3292941 A1 | 3/2018 |

(Continued)

OTHER PUBLICATIONS

International Search Report and Written Opinion PCT/US2017/013463 dated May 10, 2017.

(Continued)

*Primary Examiner* — Queenie S Dehghan
(74) *Attorney, Agent, or Firm* — Russell S. Magaziner (57) ABSTRACT

Systems and methods utilizing two Airy beams to process a non-rounded edge of a glass substrate or to cleave a glass substrate are disclosed. The method includes generating first and second Airy beams and causing them to cross at a crossing to define a curved intensity profile in the vicinity of the crossing point where the first and second Airy beams have respective local radii of curvature RA and RB. The method also includes scanning the curved intensity profile either along the non-rounded outer edge or through the glass along a scan path to form on the glass substrate a rounded outer edge having a radius of curvature RE that is smaller than the first and second local radii of curvature RA and RB. The radius of curvature RE can be adjusted by changing a beam angle between the first and second Airy beams.

11 Claims, 12 Drawing Sheets

(51) Int. Cl.
　　　B23K 26/354　　(2014.01)
　　　C03B 33/02　　(2006.01)
　　　C03B 33/10　　(2006.01)
　　　B23K 26/06　　(2014.01)
　　　B23K 26/53　　(2014.01)
　　　B23K 103/00　　(2006.01)
(52) U.S. Cl.
　　　CPC ............ B23K 26/402 (2013.01); B23K 26/53 (2015.10); C03B 33/0222 (2013.01); C03B 33/102 (2013.01); *B23K 2103/54* (2018.08)

(56) References Cited

U.S. PATENT DOCUMENTS

| | | | |
|---|---|---|---|
| 2011/0133104 A1 | 6/2011 | Dholakia et al. | |
| 2015/0136743 A1* | 5/2015 | Hosseini | B23K 26/364 219/121.61 |
| 2015/0158120 A1 | 6/2015 | Courvoisier et al. | |
| 2015/0166396 A1 | 6/2015 | Marjanovic et al. | |
| 2016/0016257 A1* | 1/2016 | Hosseini | B23K 26/0648 65/112 |

FOREIGN PATENT DOCUMENTS

| | | |
|---|---|---|
| JP | 2011025272 A | 2/2011 |
| WO | 2017188639 A1 | 11/2017 |

OTHER PUBLICATIONS

Berry et al., "Nonspreading wave packets," Am. J. Phys., 47(3), pp. 264-267 (1979).
Panagiotopoulos et al., "Sharply autofocused ring-Airy beams transforming into non-linear intense light bullets," Nature, vol. 494, 331-335, (2013).
Siviloglou et al, "Accelerating finite energy Airy beams," Opt. Lett. 32, 979-981 (2007).
Bhuyan et al., "High aspect ratio nanochannel machining using single shot femtosecond Bessel beams," App. Phys. Lett. 101, 071110 (2012).
Mathis et al, "Direct machining of curved trenches in silicon with femtosecond accelerating beams," J. Europ. Opt. Soc. Rap. Public 8, 13019 (2013).
Siviloglou et al., "Observation of Accelerating Airy Beams," Phys. Rev. Lett. 99, 213901 (2007).
Mathis et al, "Micromachinig along a curve: Femtosecond laser micromachining of curved profiles in diamond and silicon using accelerating beams," App. Phys. Lett. 101, 071110 (2012).
Arlt and Dholakia, "Generation of high-order Bessel beams by use of an axicon," Optics Communications, vol. 177, pp. 297-301, 2000.
Arnold et al, "Nonlinear Bessel vortex beams for applications," J. Phys. B 48, 094006 (2015) 10 pgs.
Hof and Ziki, "Micro-Hole Drilling on Glass SubstratesA Review," Micromachines 8(2), 53, 23 pgs, 2017.
Hwang et al. "Liquid-assisted femtosecond laser drilling of straight and three-dimensional microchannels in glass," Applied Physics A, vol. 79, pp. 605-612, 2004.
Li et al, "Generation of perfect vectorial vortex beams," Optics Letters 41(10) 2205-2208, 2016.
Lopez-Mariscal and Gutierrez-Vega, "The generation of nondiffracting beams using inexpensive computer-generated holograms," Am. J. Phys. 75, 36-42 (2007).
McGloin and Dholakia, "Bessel beams: diffraction in a new light," Contemporary Physics, vol. 46, pp. 15-28, 2005.
Ogura and Yoshida, "Hole Drilling of Glass Substrates with a CO2 Laser," Jpn. J. Appl. Phys. vol. 42, pp. 2881-2886, 2003.
Paterson and Smith, "Higher-order Bessel waves produced by axicon-type computer-generated holograms," Optics Communications, vol. 124, pp. 121-130, 1996.
Porras et al. "Stabilization of vortex beams in Kerr media by nonlinear absorption," Physical Review A, vol. 94 (5), 8 pgs, 2016.
Ran et al, "Laser Micro-Hole Drilling of Soda-Lime Glass with Femtosecond Pulses," Chinese Physics Letters, vol. 21, pp. 2465-2468, 2004.
Tao et al, "Fractional optical vortex beam induced rotation of particles," Appl. Opt. 43 122-126, 2004.
Vaity and Rusch, "Perfect vortex beam: Fourier transformation of a Bessel beam," vol. 40, pp. 597-600, 2015.
Xie et al, "Light trajectory in Bessel-Gauss vortex beams," Journal of the Optical Society of America A, vol. 32, issue 7, pp. 1313-1316, 2015.
Zhang et al, "High-speed machining of glass materials by laser-induced plasma-assisted ablation using a 532-nm laser," Applied Physics A, vol. 67, pp. 499-501, 1998.

* cited by examiner

DUAL-AIRY-BEAM SYSTEMS AND METHODS FOR PROCESSING GLASS SUBSTRATES

This application claims the benefit of priority under 35 U.S.C. § 119 of U.S. Provisional Application Ser. No. 62/278,657 filed on Jan. 14, 2016, the content of which is relied upon and incorporated herein by reference in its entirety.

FIELD

The present disclosure relates to glass processing, and in particular relates to systems and methods for processing glass substrates using dual Airy beams.

BACKGROUND

Glass processing, including glass cutting (cleaving) and edge finishing, is important in the formation of glass articles such as display glasses, glass panels and cover glasses. In particular, the square edges of glass sheets are prone to breakage and can be processed to have bevels or to be rounded to minimize the chance of breakage. This processing can be accomplished using mechanical means, such as mechanical grinding. Likewise, glass substrates need to be cleaved to have select dimensions and shapes. This processing can also be accomplished using mechanical means, such as a using diamond-blade saw. Unfortunately, mechanical processing of glass substrates is complex and generates glass dust and glass particles, which must be removed.

As an alternative, the cleaving and edge processing operations can be performed using conventional laser processing rather than mechanical process. However, conventional laser processing utilizes laser beams that travel in a straight line in free space and so are difficult to use when a rounded outer edge or like edge shaping is desired.

SUMMARY

An aspect of the disclosure is a method of cleaving a glass substrate to produce a rounded outer edge. The method includes: a) generating first and second Airy beams; b) causing the first and second Airy beams to cross at a crossing point in free space to define a curved intensity profile in the vicinity of the crossing point, with the first and second Airy beams respectively having first and second local radii of curvature RA and RB at the crossing point; and c) scanning the curved intensity profile through the glass along a scan path to form a cleaving line that defines rounded outer edge having a radius of curvature RE that is smaller than the first and second local radii of curvature RA and RB.

Another aspect of the disclosure a method of processing a non-rounded outer edge of a glass substrate. The method includes: a) generating first and second Airy beams along respective first and second axes that define a beam angle $\theta B$ that is in the range $0.1\pi$ radians$<\theta B<\pi$ radians; b) causing the first and second Airy beams to cross at a crossing point in free space to define a curved intensity profile in the vicinity of the crossing point, wherein first and second Airy beams have respective first and second local radii of curvature RA and RB at the crossing point; and c) inserting at least a portion of the substantially non-rounded outer edge of the glass substrate into curved intensity profile to form a rounded outer edge over the portion having a radius of curvature RE that is smaller than the first and second local radii of curvature RA and RB.

Another aspect of the disclosure is a system for processing a glass substrate to produce a rounded outer edge. The system includes: first and second Airy-beam-forming systems that have respective optical axes A1 and A2 and that respectively generate first and second Airy beams; first and second adjustable support devices that operably support the first and second Airy-beam-forming optical systems to define a crossing point in free space where the first and second Airy beams cross and define a curved intensity profile in the vicinity of the crossing point, wherein first and second Airy beams having respective first and second local radii of curvature RA and RB at the crossing point; a movable stage configured to support the glass substrate relative to the crossing point; and wherein the curved intensity profile has a radius of curvature RP that is smaller than the either of the first and second local radii of curvature RA and RB.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

Cartesian coordinates are shown in some of the Figures for the sake of reference and are not intended to be limiting as to direction or orientation.

The entire disclosure of any publication or patent document mentioned herein is incorporated by reference, including the following:

Berry et al., "Nonspreading wave packets," Am. J. Phys., 47(3), pp. 264-267 (1979).

Panagiotopoulos et al., "Sharply autofocused ring-Airy beams transforming into non-linear intense light bullets," Nature, vol. 494, 331-335, (2013);

Siviloglou et al, "Accelerating finite energy Airy beams," Opt, Lett. 32, 979-981 (2007);

Bhuyan et al., "High aspect ratio nanochannel machining using single shot femtosecond Bessel beams," App. Phys. Lett. 101, 071110 (2012);

Mathis et al, "Direct machining of curved trenches in silicon with femtosecond accelerating beams," J. Europ. Opt. Soc. Rap. Public 8, 13019 (2013);

Siviloglou et al., "Observation of Accelerating Airy Beams," Phys. Rev. Lett. 99, 213901 (2007)

US 2011/0133104, entitled "Optical manipulation of micro-particles," by Dholakia et al.; and US 2015/0158120, entitled "Laser micromachining device and method," by Courvoisier et al.

In the discussion below, reference is made to an "Airy beam." This term is used herein to generally to refer to a type of beam described in the above-cited references and which is also referred to in the art as a self-bending beam, an accelerating beam, a self-accelerating beam, a non-diffracting beams, etc. As discussed in the above-cited references, an Airy beam has a curvature in free space due to the beam having a select phase imparted to it using, for example, a spatial light modulator.

Also in the discussion below, the following unit abbreviations are used: s=second, mm=millimeter, KHz=kilohertz, MHz=megahertz, μm=micron, fs=femtosecond, ps=picosecond, w=watt and mw=milliwatt.

Dual-Beam System

Figure 1:
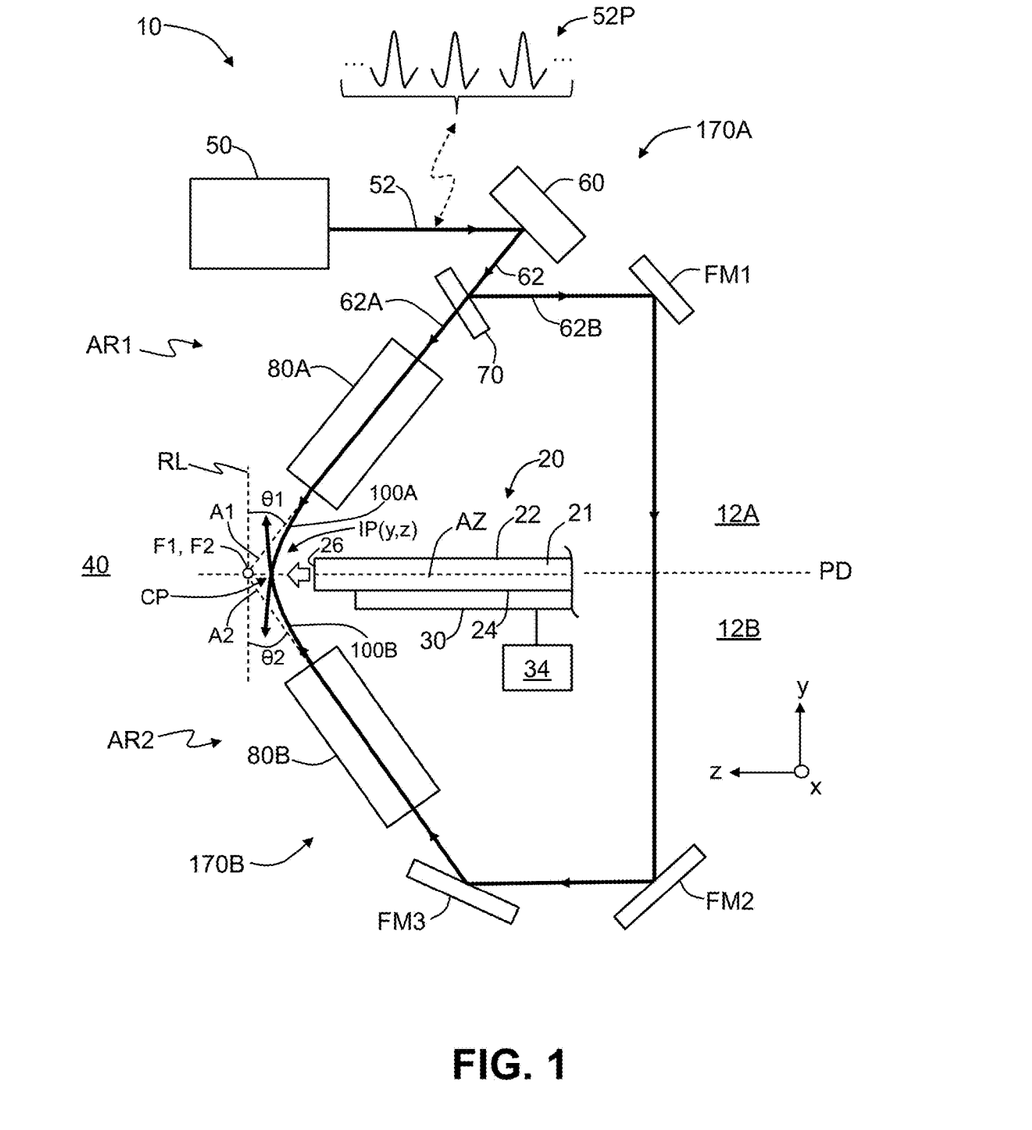
FIG. 1 is a schematic diagram of an example dual-Airy-beam system for processing a glass substrate according to the disclosure.

FIG. 1 is a schematic diagram of an example dual-Airy-beam system ("system") 10 according to the disclosure. System 10 is configured to process a glass substrate 20. The processing can include edge processing or glass substrate cleaving, as described below.

Figure 2A:
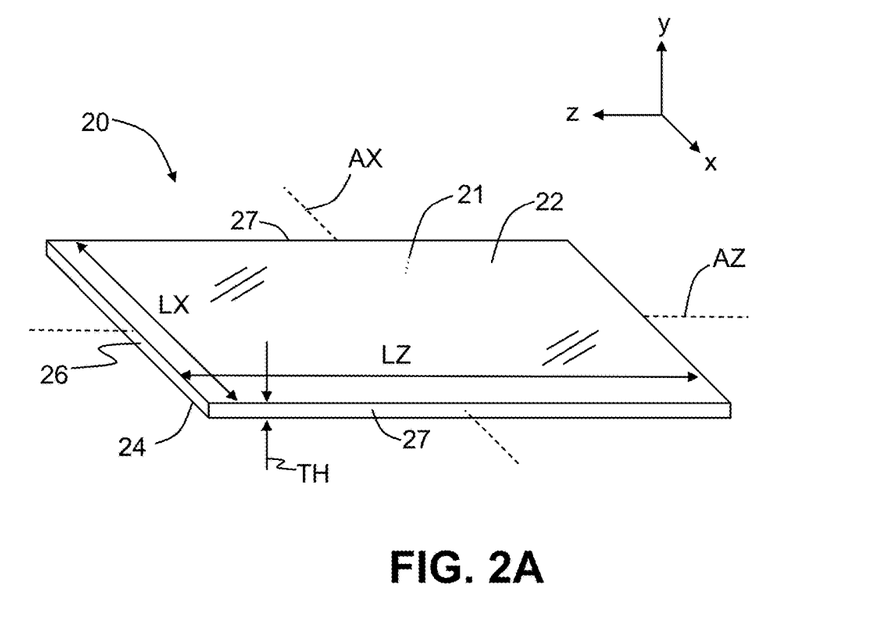
FIG. 2A is a top-elevated view of an example glass substrate in the form of a glass sheet.

FIG. 2A is a top-elevated view of an example glass substrate 20 in the form of a glass sheet. The glass substrate 20 includes a body 21, an upper surface 22, a lower surface 24, an outer edge 26 and sides 27. In an example, outer edge 26 is non-rounded, e.g., has square or substantially square edges as viewed in a y-z plane cross-section. The glass substrate 20 has a thickness TH (which in an example is constant) and includes central axes Ax and Az that run down the middle of the glass substrate in the x-direction and z-direction, respectively, i.e., each axis Ax and Az is equidistant from the upper and lower surfaces 22 and 24. In an example, the outer edge 26 runs in the x-direction and has a length LX while sides 27 run in the z-direction. The glass substrate 20 also has a dimension in the z direction of LZ. In an example, the thickness TH can be in the range 20 μm to 10000 μm.

With reference again to FIG. 1, glass substrate 20 is operably supported in system 10 by a movable stage 30, which is optionally controlled by a stage controller 34 operably connected to the movable stage. In an example, outer edge 26 of glass substrate 20 resides in free space 40. In an example, glass substrate 20 lies substantially in a plane PD that resides in the x-z plane and that divides system 10 into upper and lower sections 12A and 12B. In an example, glass substrate 20 is in the form of the aforementioned glass sheet, with upper and lower surfaces 22 and 24 being substantially parallel. Example glass-sheet glass substrates 20 include those used for smart phones, tablets, flat-panel displays or televisions.

System 10 also includes a laser source 50 that emits a laser beam 52 that is made up of short (e.g., in the range from femtoseconds to picoseconds) light pulses 52P, as shown in the close-up inset. System 10 also includes a phase-adjustment device 60 (e.g., a phase plate or spatial light modulator) arranged to receive and adjust a phase of laser beam 52 to form a phase-adjusted laser beam 62. The phase adjustment imparted to laser beam 52 by phase-adjustment device 60 is that which is known in the art to ultimately form an Airy beam, as discussed below. The phase-adjustment device 60, which is shown as being reflective by way of example, can also be transmissive.

The example system 10 of FIG. 1 also includes a beam splitter 70. The beam splitter 70 is arranged to divide the phase-adjusted laser beam 62 into first and second phase-adjusted laser beams 62A and 62B. The first phase-adjusted laser beam 62A passes through beam splitter 70 and travels along a first arm AR1 of system 10, and the second phase-adjusted laser beam 62B is reflected from the beam splitter and travels along a second arm AR2 of the system. The first phase-adjusted laser beam 62A travels to a first optical system 80A. The first optical system 80A defines a first optical axis A1 and has a first focus F1 and is arranged to receive the first phase-adjusted laser beam 62A and form therefrom a first Airy beam 100A. The first Airy beam 100A travels generally in the −y direction and traverses a curved path through free space 40 in which the outer edge 26 of glass substrate 20 resides. Since the path of first Airy beam 100A in free space 40 is curved, it does not necessarily pass through the first focus F1, which is a property of the first optical system 80A and not the first Airy beam.

System 10 also includes fold mirrors FM1, FM2 and FM3, along with a second optical system 80B, all arranged in the second arm AR2 of system 10. The second optical system 80B defines a second optical axis A2 and a second focus F2. The fold mirrors FM1, FM2 and FM3 are configured to receive and reflect the second phase-adjusted laser beam 62B and direct it to optical system 80B. The optical system 80B forms from the second phase-adjusted laser beam 62B a second Airy beam 100B that travels generally in the +y direction and traverses a curved path through free space 40 in which the outer edge 26 of glass substrate 20 resides. Since the path of second Airy beam 100B in free space 40 is curved, it does not necessarily pass through the first focus F2, which is a property of the second optical system 80B and not the second Airy beam.

The first and second optical systems 80A and 80B are arranged such that first and second optical axes A1 and A2 intersect so that the first and second Airy beams 100A and 100B cross at a crossing point CP. Thus, the first and second Airy beams 100A and 100B are also referred to herein as "crossed Airy beams" 100A and 100B. The first and second optical axes A1 and A2 make respective first and second axis angles θ1 and θ2, which are measured by way of example relative to a reference line RL that runs in the y-direction. Also in an example, the focuses F1 and F2 are co-located, or substantially co-located, while in another example as described below, the two focuses can be spaced apart. In an example, first and second Airy beams 100A and 100B are substantially the same and differ only in that they travel in different directions.

Laser 50, phase-adjustment device 60 and first optical system 80A define a first Airy-beam-forming system 170A that forms first Airy beam 100A, while laser 50, phase-adjustment device 60 and second optical system 80B define a second Airy-beam-forming system 170B that forms second Airy beam 100B. In an example, first and second Airy beams 100A and 100B are pulsed beams by virtue of laser beam 50 being a pulsed laser beam.

Figure 2B:
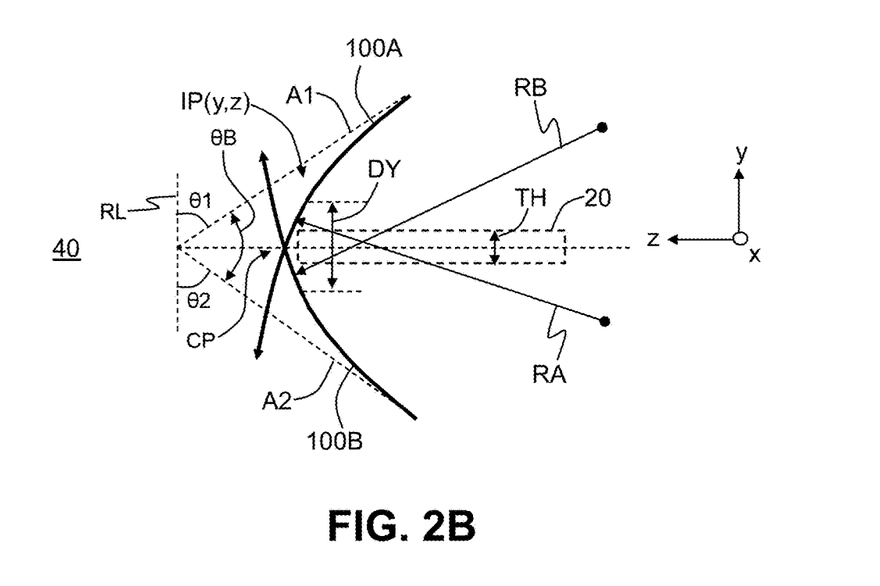
FIG. 2B is a close-up view of the first and second Airy beams of the system of FIG. 1, wherein the beams cross at a crossing point, and showing how local radii of curvatures RA and RB can be assigned to the first and second Airy beams respectively in the vicinity of the crossing point and how the crossed Airy beams define a intensity profile IP(y,z) with a radius of curvature RP that is less than either RA or RB.

In an example, crossing point CP of crossed Airy beams 100A and 100B at least initially resides adjacent outer edge 26 of glass substrate 20 and further in an example resides along the central z-axis of the glass substrate. FIG. 2B is a close-up view of the crossed Airy beams 100A and 100B, with each Airy beam traveling a curved path through free space 40. The crossed Airy beams 100A and 100B define an intensity profile IP(y, z) in the vicinity of crossing point CP, e.g., over a distance DY in the y-direction centered on the crossing point. In an example, the distance DY is in the range 0.5TH<DY<2.5TH. The first and second Airy beams 100A and 100B are essentially line beams, i.e., they have a relatively narrow width relative to their length. In an example, the first and second Airy beams 100A and 100B have a width Δx (see FIG. 4D) in the range 0.5 μm<Δx<500 μm, which in many cases will be much smaller than the length LX of outer edge 26 of glass substrate 20.

While the first and second Airy beams 100A and 100B each typically travels over a curved path that is more complex than just a circular arc (i.e., parabolic, hyperbolic, etc.), one can assign local radii of curvature RA and RB to the respective portions of the first and second Airy beams in the vicinity of the crossing point CP, such as shown in FIG. 2B. These local radii of curvature RA and RB can also be considered effective radii of curvature for the first and second Airy beams 100A and 100B, respectively.

FIG. 2B also shows a beam angle θB measured between the first and second axes A1 and A2. The beam angle θB can be expressed in terms of the axis angles θ1 and θ2 as follows: θB=π−(θ1+θ2), where the angles are measured in radians. Thus, as one or both of the axis angles θ1 and θ2 increase, the beam angle θB decreases. Since the beam angle θB can be readily determined from the axis angles θ1 and θ2, for ease of illustration, only the axis angles θ1 and θ2 are shown in some of the Figures. In an example, the beam angle θB is in the range 0.1π radians<θB<π radians.

It is noted that the beam angle θB represents the angle between the first and second Airy beams 100A and 100B for their initial launch direction along axes A1 and A2 respectively, and is simply one convenient way to describe the relative orientation of the two Airy beams. The path of a given Airy beam can be measured or calculated based on the imparted phase and the characteristics of the optical system used to form the Airy beam. Thus, knowledge of the initial launch direction and the curved path of the Airy beam in free space allows one to determine its instantaneous propagation location and direction at any point along the Airy beam, including at crossing point CP.

Figure 2C:
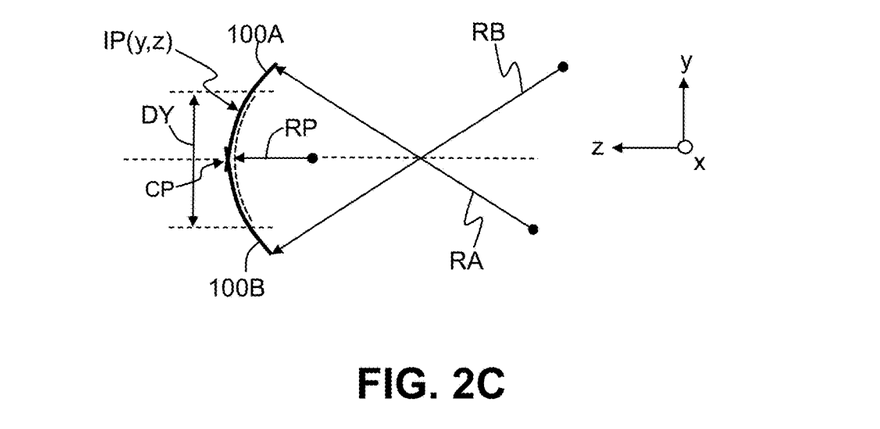
FIG. 2C is similar to FIG. 2B and illustrates an example of an intensity profile IP(y,z) defined by the crossed Airy beams, with the intensity profile having a profile radius RP in the vicinity of the crossing point, wherein RP<RA, RB.

FIG. 2C is similar to FIG. 2B and shows how the crossed Airy beams 100A and 100B define an intensity profile IP(y,z) in the vicinity of crossing point CP. The intensity profile IP(y,z) has a local radius of curvature RP ("profile radius") that is smaller than either individual radius RA or RB. In various examples where RA=RB, and profile radius RP<(0.8)RA, or RP<(0.5)RA, or RPE<(0.25)RA, or RE<(0.1)RA.

Figure 3:
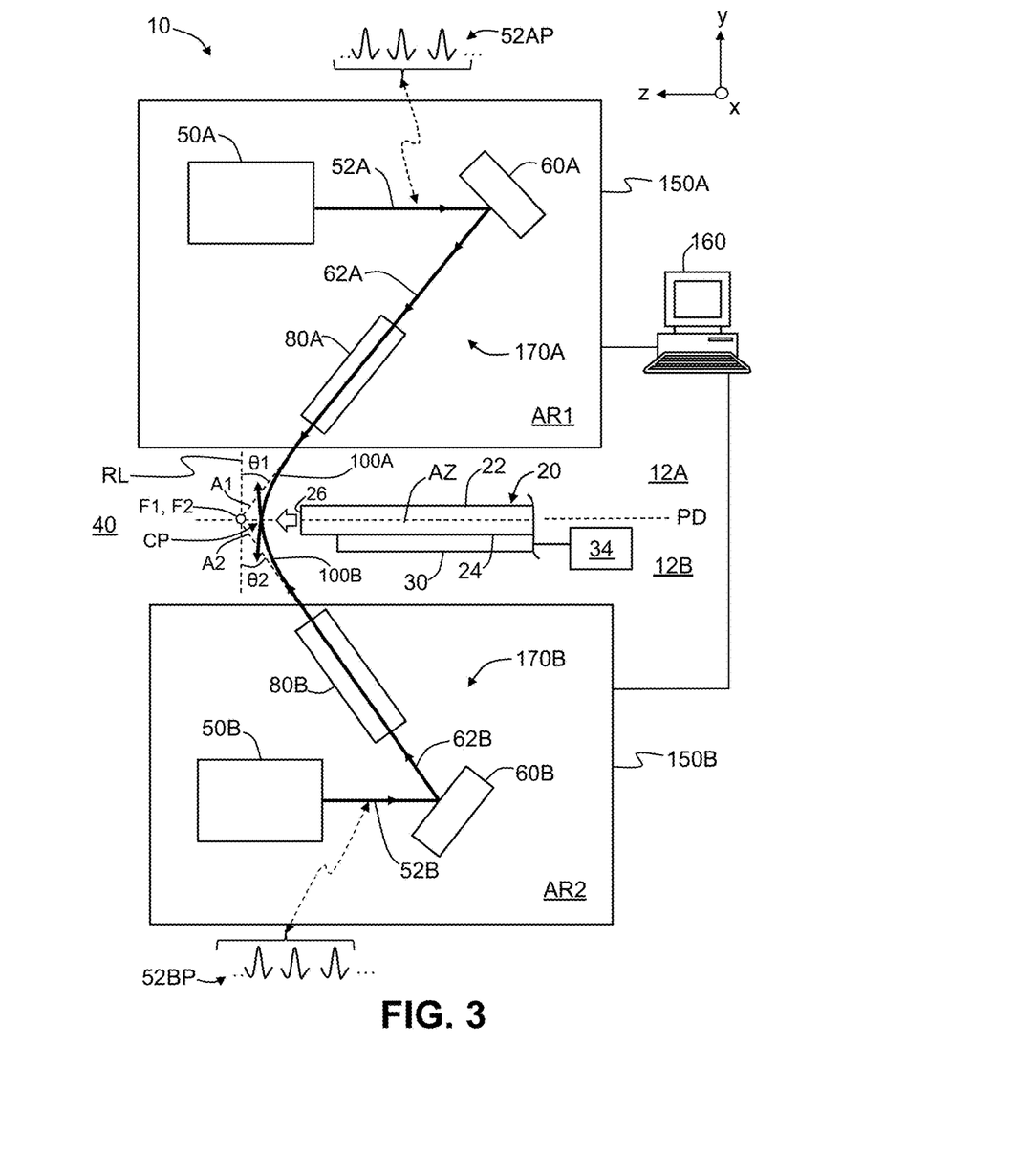
FIG. 3 is similar to FIG. 1 and shows an example dual-Airy-beam system that includes first and second lasers and first and second phase-adjustment devices that define first and second Airy-beam-forming systems, along with first and second adjustable support devices that respectively operably and movable support the first and second Airy-beam-forming systems.

FIG. 3 is an example embodiment of system 10 similar to that of FIG. 1, but includes two lasers 50, namely 50A and 50B, along with corresponding two phase-adjustment devices 60, namely 60A and 60B that are operably arranged relative to lasers 50A and 50B respectively and form corresponding phase-adjusted laser beams 62A and 62B from respective laser beams 52A and 52B. Since two different phase-adjustment devices 60A and 60B are employed, the respective phase-adjusted laser beams 62A and 62B need not be identical or even substantially identical and in an example differ substantially, e.g., in the degree to which the two beams bend when propagating, the intensity profiles, etc. As in system 10 of FIG. 1, light beams 52A and 52B can each be made up of light pulses 52AP and 52BP.

The system 10 of FIG. 3 includes first and second adjustable support devices 150A and 150B that operably and movably support first and second arms AR1 and AR2. In an example, the first and second adjustable support devices 150A and 150B are independently rotatable and translatable, which can be used to independently change the first and second axis angles θ1 and θ2 (and thus beam angle θB) while also either maintaining a fixed location for crossing point CP or changing the location of the crossing point, depending on the desired processing effect. In an example, first and second adjustable support devices 150A and 150B are operably connected to a controller 160 that is configured (e.g., via instructions embodied in a non-transitory computer-readable medium) to control the operation of the first and second adjustable support devices in carrying out the methods disclosed herein, including scanning operations for cleaving and edge processing, as discussed below.

In the example system 10 of FIG. 3, laser 50A, phase-adjustment device 60A and first optical system 80A define the first Airy-beam-forming system 170A, while laser 50B, phase-adjustment device 60B and second optical system 80B define the second Airy-beam-forming system 170B. In an example, the first and second adjustable support devices 150A and 150B operably and respectively support at least respective portions of the first and second Airy-beam-forming systems 170A and 170B. In an example, first and second arms AR1 and AR2 respectively contain at least portions of the first and second Airy-beam-forming systems 170A and 170B.

Figure 4A:
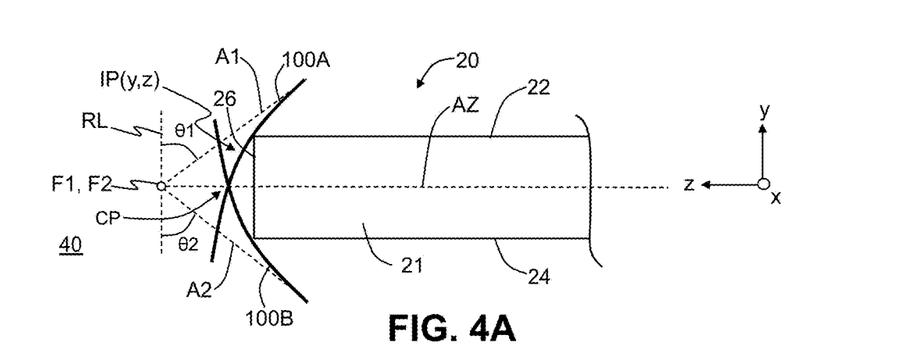
FIGS. 4A through 4C are close-up cross-sectional views of an end portion of the glass substrate that includes its outer edge, which is disposed adjacent the first and second Airy beams at their crossing point, and illustrating an example exposure process that forms a rounded outer edge on the glass substrate.
Figure 4B:
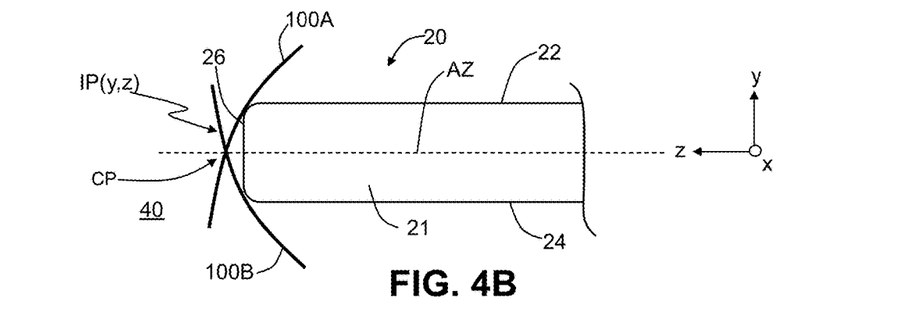
Figure 4C:
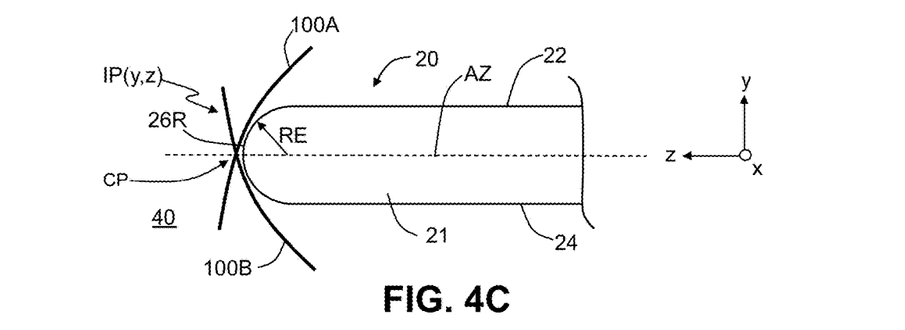
Figure 4D:
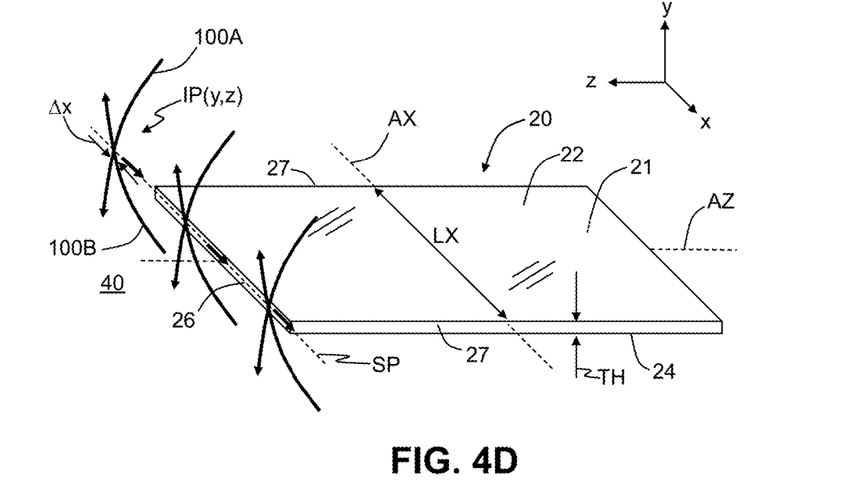
FIG. 4D is an elevated view of the glass substrate similar to FIG. 2A and showing how the crossed Airy beams can be scanned relative to the outer edge of the glass substrate over a scan path that runs along the outer edge to process a portion of the outer edge, wherein the processed portion has a length greater than the width intensity profile IP(y,z) formed by the crossed first and second Airy beams.

FIGS. 4A through 4C are close-up cross-sectional views of an end portion of glass substrate 20 that includes outer edge 26 disposed adjacent first and second Airy beams 100A and 100B at crossing point CP, with the Figures illustrating an example exposure process that forms a rounded outer edge 26R, as shown in FIG. 4C. FIG. 4D is a top elevated view of glass substrate 20 showing crossed Airy beams 100A and 100B being moved together (i.e., scanned) over a scan path SP along outer edge 26, while FIG. 4E corresponds to FIG. 4C and shows the rounded outer edge 26R that results from the scanning operation shown in FIG. 4D. The scanning operation can be carried out by moving at least one of: a) the crossed Airy beams 100A and 100B, and b) the glass substrate 20. The first and second Airy beams 100A and 100B can be moved over scan path SP along outer edge 26 using first and second adjustable support devices 150A and 150B while the glass substrate can be moved using movable stage 30.

With reference to FIGS. 4A and 4D, outer edge 26 of glass substrate 20 is inserted into the crossed Airy beams 100A and 100B by the action of movable stage 30 to initiate the exposure process. The crossed Airy beams 100A and 100B are shown in this example as being symmetrically arranged, with crossing point CP and focuses F1 and F2 (associated with first and second optical axes A1 and A2) residing along the central z-axis of the glass substrate. In FIG. 4A, the crossed Airy beams 100A and 100B present a concave intensity variation in the vicinity of outer edge 26 due to the curved nature of these beams as they propagate through free space 40.

The intensity profile IP(y,z) defined by crossed Airy beams 100A and 100B acts on outer edge 26 to create a convex rounded outer edge 26R (e.g., a "bull nose" edge) for at least a portion of the length of the outer edge. The rounded outer edge 26R has a radius of curvature RE ("edge radius") that is defined by profile radius RP, so that edge radius RE is less than the effective radii of curvature RA and RB of the first and second Airy beams 100A and 100B respectively (i.e., RE<RA, RB) because the crossed Airy beams are respectively directed to outer edge 26 at respective first and second axis angles θ1 and θ2. In various examples where RA=RB, and the edge radius RE<(0.8)RA or RE<(0.5)RA or RE<(0.25)RA or RE<(0.1)RA. In an example, the edge radius RE is substantially equal to the profile radius RP.

In an example, glass substrate 20 can be translated in the z-direction so that it extends deeper into first and second Airy beams 100A and 100B during the exposure process and as the curvature of outer edge 26 evolves into rounded outer edge 26R. Once at least a portion of the length of outer edge 26 has been transformed to rounded outer edge 26R, glass substrate 20 can be extracted from the first and second Airy beams 100A and 100B by the operation of movable stage 30.

Figure 4E:
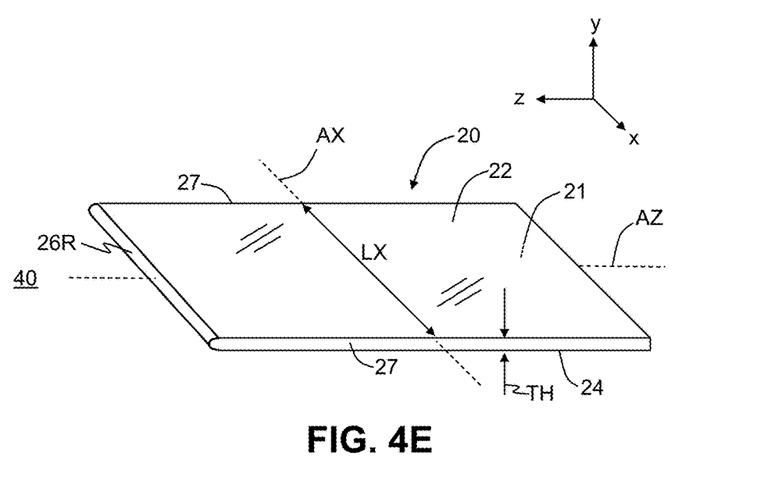
FIG. 4E is similar to FIG. 4D and shows the processed glass substrate as formed from the scanning process shown in FIG. 4D, wherein the glass substrate has a rounded outer edge over the length of the outer edge.

In an example, crossed Airy beams 100A and 100B are scanned relative to (i.e., along) outer edge 26 over scan path SP, as shown in FIG. 4D to process a portion of the length LX of the outer edge that is greater than the width Δx of the first and second Airy beams 100A and 100B. In an example such as shown in FIG. 4D, crossed Airy beams 100A and 100B are scanned over the entire length LX of outer edge 26 so that the entire length of the outer edge becomes rounded outer edge 26R, as shown in FIG. 4E.

Figure 5:
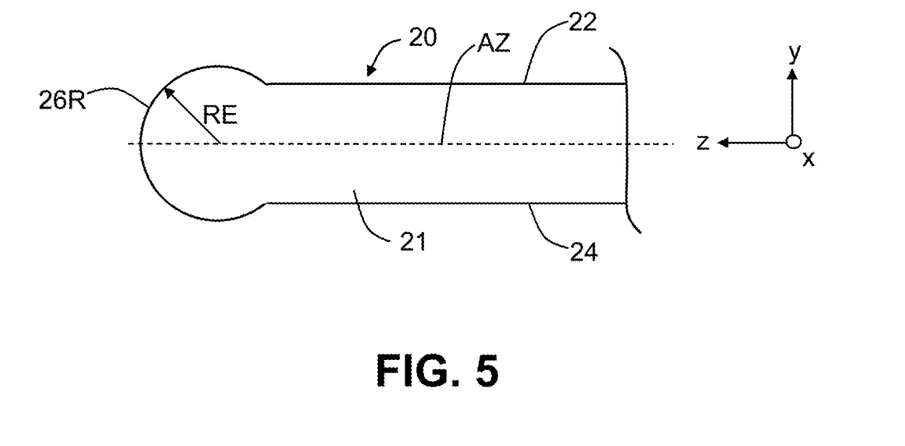
FIG. 5 is a close-up view of the outer edge of the glass substrate similar to FIG. 4C that shows an example wherein the rounded outer edge of the glass substrate is bulbous.

FIG. 5 is similar to FIG. 4C and illustrates an example wherein the exposure process is carried out in a manner that results in a bulbous rounded outer edge 26R. This can be accomplished in one example by providing sufficient intensity for intensity profile IP(y,z) so that the glass softens and flows. Having a bulbous rounded outer edge 26R can be advantageous in cases where a small radius of curvature R is desirable since the bulbous rounded outer edge typically supports a smaller radius of curvature RE than that for a non-bulbous rounded outer edge.

Figure 6A:
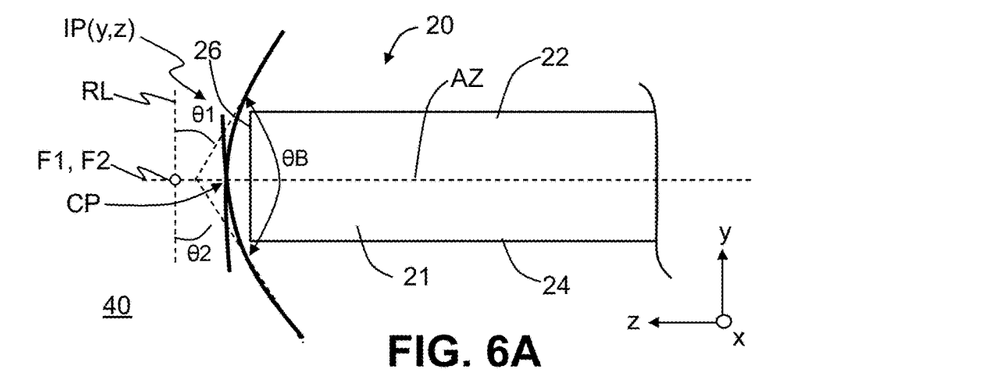
FIGS. 6A through 6C are similar to FIGS. 4A through 4C and illustrate an example exposure process wherein the axis angles (and thus the beam angle) of the crossed Airy beams are adjusted during the exposure process that forms the rounded outer edge.
Figure 6B:
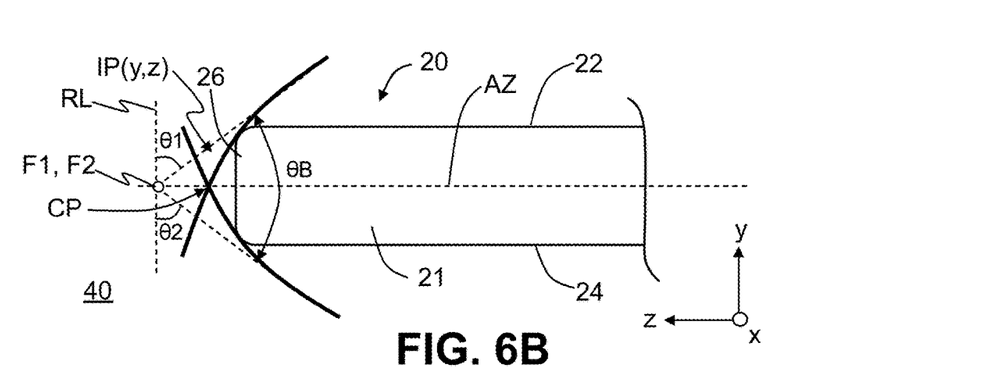
Figure 6C:
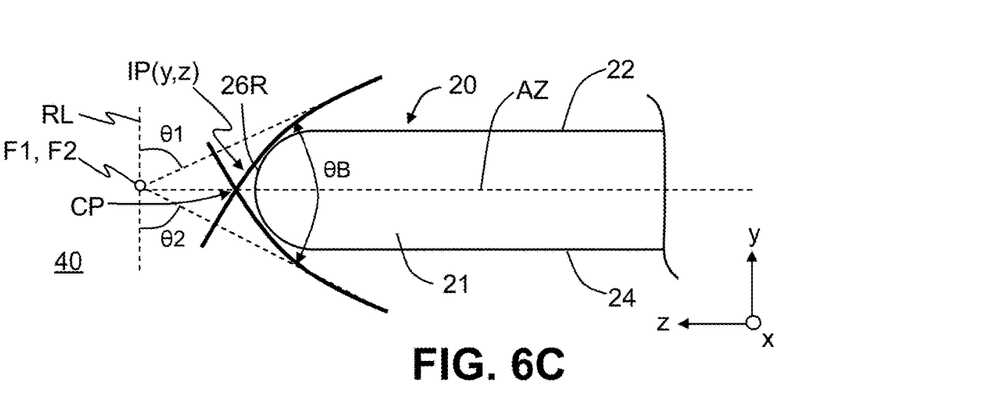

FIGS. 6A through 6C are similar to FIGS. 4A through 4C and illustrate an example edge processing method using system 10 wherein first and second axis angles θ1 and θ2 associated with the generation of the first and second Airy beams 100A and 100B are adjusted during exposure of outer edge 26. This results in adjusting the beam angle θB. FIGS. 6A through 6C show the first and second axis angles θ1 and θ2 as starting out relatively shallow in FIG. 6A and increasing in FIGS. 6B and 6C during exposure of outer edge 26. This corresponds to the beam angle θB starting out relatively large in FIG. 6A and then decreasing in FIG. 6B and FIG. 6C. In this example, the edge radius RE starts out relatively large and then decreases during the exposure process as rounded outer edge 26R is being formed.

In another related example, the first and second axis angles θ1 and θ2 can start out relatively steep and then decrease during exposure of outer edge 26. This corresponds to the beam angle starting out relatively small and getting larger θB. In this related example, the edge radius RE starts out relatively small and then increases during the exposure process as rounded outer edge 26R is being formed. Each of these example processes can be used to tailor the final shape of rounded outer edge 26E.

In one example, glass substrate 20 can be translated in the +z-direction during the exposure process to keep outer edge 26 within the first and second Airy beams 100A and 100B (i.e., within intensity profile IP(y,z)) as the first and second axis angles θ1 and θ2 are adjusted. In another example, adjustable support devices 150A and 150B that operably and movably support respective arms AR1 and AR2 (see FIG. 3) can be used to adjust the first and second axis angles θ1 and θ2 as well as translate the crossed Airy beams 100A and 100B (e.g., in the −z-direction) to either keep the intensity profile IP(y,z) in the same general location or to move the intensity profile in the −z-direction during the exposure process.

Thus, outer edge 26 of glass substrate 20 can have its shape and its curvature tailored by adjusting at least one of: the respective intensities of the first and second Airy beams 100A and 100B; the first and second axis angles θ1 and θ2; and the relative position of glass substrate 20 to the intensity profile IP(y,z) during the exposure process.

Figure 7A:
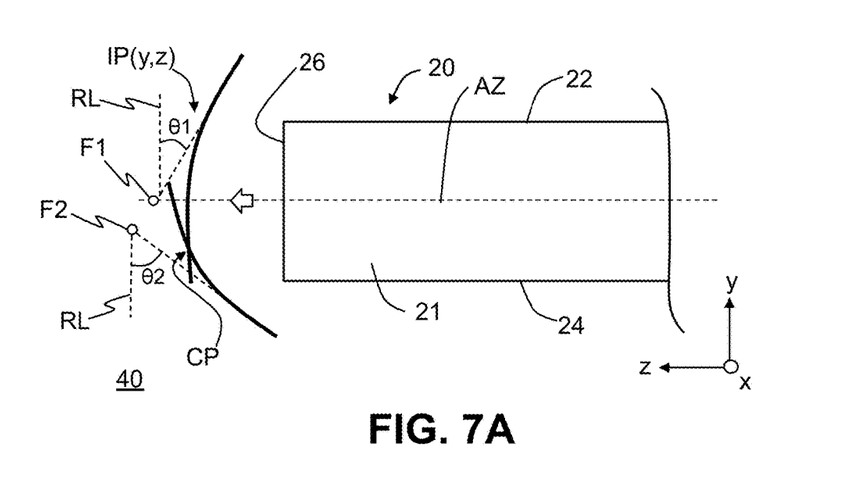
FIGS. 7A and 7B are similar to FIGS. 6A and 6C an illustrate an example exposure process wherein the first and second Airy beams are not symmetrically arranged relative to the central z-axis of the glass substrate and form an asymmetric rounded outer edge on the glass substrate.
Figure 7B:
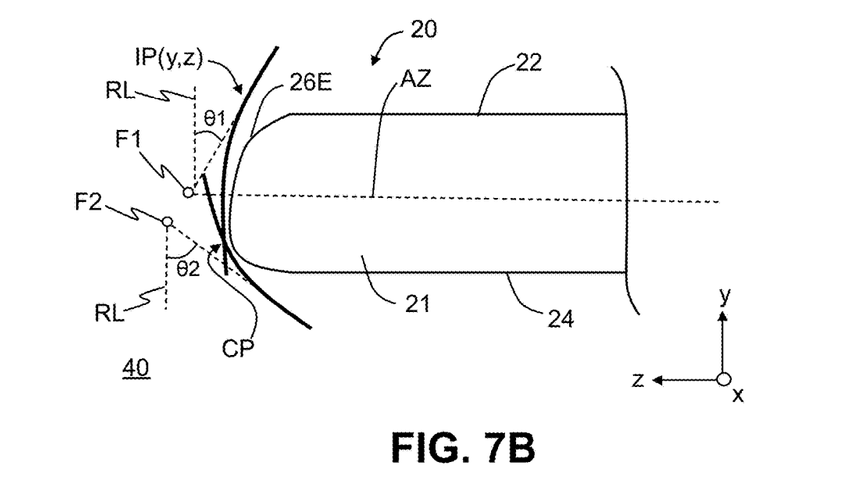

FIGS. 7A and 7B illustrate an example edge process where the crossed Airy beams 100A and 100B are not symmetrically arranged. In an example, the first and second focuses F1 and F2 are not co-located and do not both reside along the central z-axis AZ of glass substrate 20. Furthermore, the effective radii of curvature RA and RB of the first and second Airy beams 100A and 100B are not the same. Further in the example, the intensities of the first and second Airy beams 100A and 100B need not be the same.

The result of this example edge processing method is shown in FIG. 7B, wherein rounded outer edge 26R is asymmetric.

Figure 8:
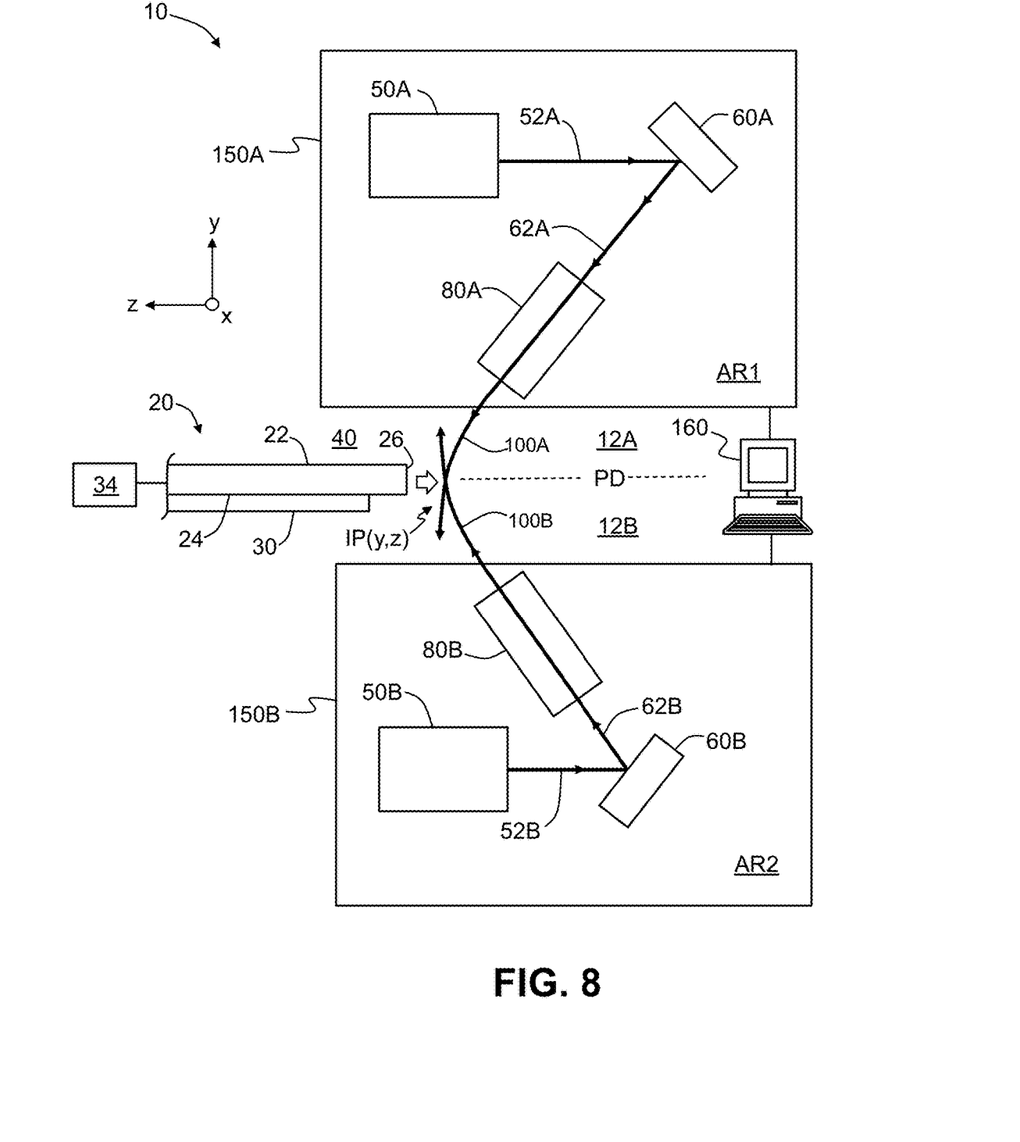
FIG. 8 is similar to FIG. 3 and illustrates an example configuration of the dual-Airy-beam system wherein the outer edge of the glass substrate is arranged such that the intensity profile IP(y,z) defined by the crossed Airy beams presents a convex shape to the outer edge.

FIG. 8 is a schematic diagram of system 10 similar to that shown in FIG. 3 and illustrates an example of where glass substrate 20 is supported by movable stage 30 on the opposite side of the crossed Airy beams 100A and 100B. In this configuration, glass substrate 20 is inserted into the intensity profile IP(y,z) defined by the crossed Airy beams 100A and 100B by moving the glass substrate in the −z-direction or by moving the crossed Airy beams 100A and 100B in the +z-direction.

Figure 9A:
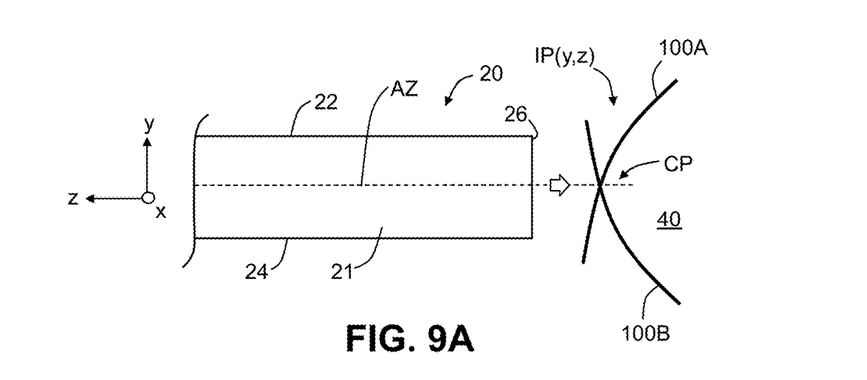
FIGS. 9A through 9C are similar to FIGS. 4A through 4C and illustrate an example exposure method using the system configuration of FIG. 8 to form a concave type of rounded outer edge in the outer edge of the glass sample.
Figure 9B:
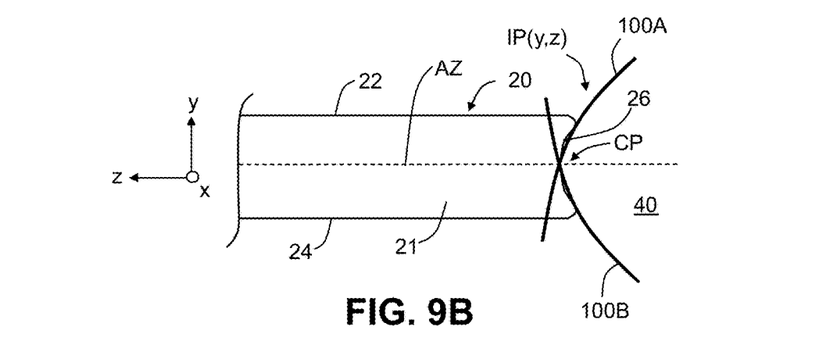
Figure 9C:
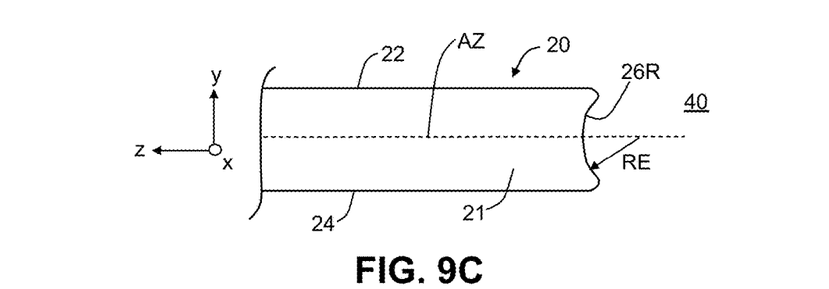

FIGS. 9A through 9C are similar to FIGS. 4A through 4C and illustrate an example edge processing method using system 10 of FIG. 7. In FIG. 9A, the outer edge 26 of glass substrate 20 is moved into the intensity profile IP(y,z) defined by the crossed Airy beams 100A and 100B, wherein the intensity profile presents a convex intensity variation with respect to the outer edge.

In the present example, the intensity profile IP(y,z) acts on outer edge 26 to define a concave rounded outer edge 26R that also has an edge radius RE<RA, RB, as shown in FIG. 9C. As with the convex rounded outer edge 26R, this concave rounded outer edge can have its shape and its curvature tailored by adjusting at least one of: the intensities of the first and second Airy beams 100A and 100B, the first and second axis angles θ1 and θ2, and the relative position of glass substrate 20 during the exposure process. In particular, as with the convex rounded outer edge 26R, the edge radius RE of a concave type of rounded outer edge can also be made smaller than the effective radii of curvature RA and RA of the first and second Airy beams 100A and 100B. In addition, like the convex rounded outer edge 26R, the concave rounded outer edge need not be formed to be symmetrical as shown.

An aspect of the systems and methods disclosed herein is directed to performing a cleaving operation on glass substrate 20 that cleaves (cuts) the glass substrate while forming rounded outer edge 26R. The cleaving method is similar to the edge processing method as described above, except that the first and second Airy beams 100A and 100B are scanned over a scan path SP that runs through glass substrate 20 rather than along outer edge 26.

Figure 10A:
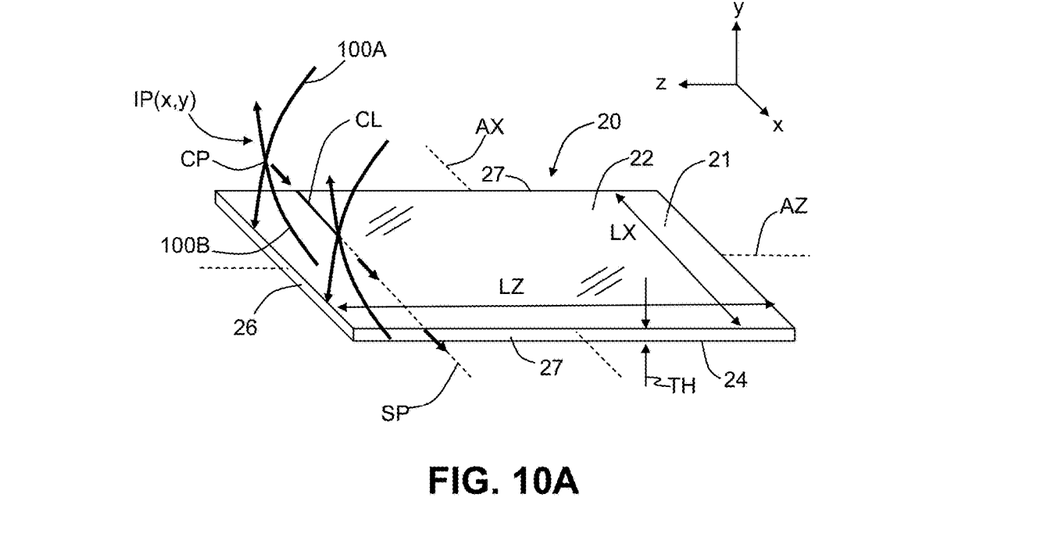
FIGS. 10A and 10B are similar to FIGS. 4D and 4E and illustrate an example where the intensity profile IP(y,z) defined by the crossed Airy beams is used to perform a cleaving operation on the glass substrate, wherein the cleaving operation results in two glass substrate sections with one having a convex rounded outer edge and the other having a concave rounded outer edge.
Figure 10B:
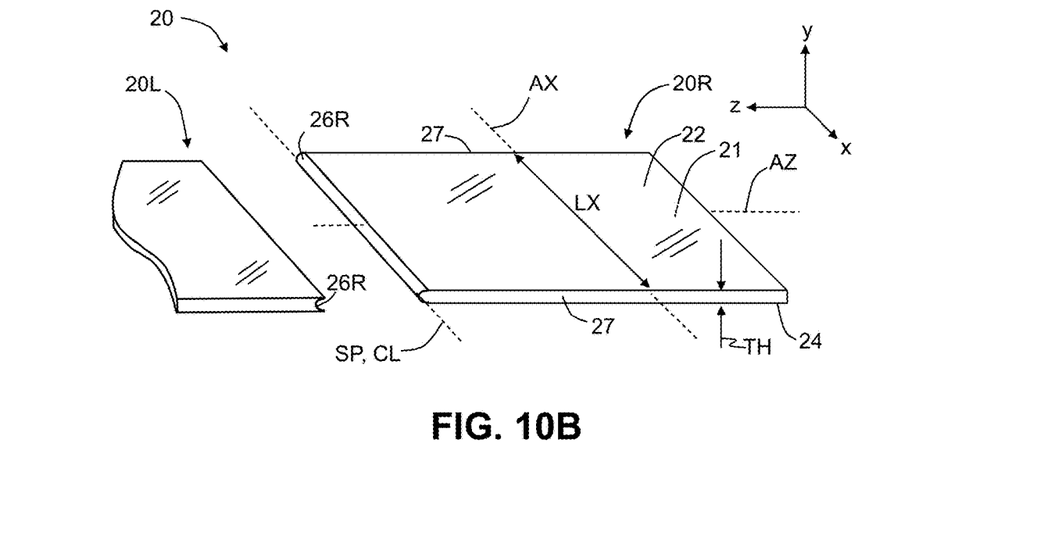

FIG. 10A is similar to FIG. 4D and shows the crossed Airy beams 100A and 100B being scanned over a scan path SP through glass substrate 20 inboard of outer edge 26. The scan path SP is shown as including a cleaving line CL, which has been formed in body 21 of glass substrate 20 by the crossed Airy beams, wherein the cleaving line extends to a point close to the middle of glass substrate 20. The continued scanning of the crossed Airy beams 100A and 100B completes the formation of cleaving line CL, which defines a rounded outer edge 26R that is inboard from the original outer edge 26. FIG. 10B shows the resulting processed glass substrate 20 having been cleaved (cut) into two glass substrate sections 20R and 20L and illustrates an example where cleaved glass substrate section 20R has a convex rounded outer edge 26R while cleaved glass substrate section 20L has a concave rounded outer edge.

In an example, the scanning of the first and second Airy beams 100A and 100B can follow a curved scan path SP so that the cleaving line CL and the corresponding rounded outer edge 26R has a curvature in the z-x plane. The intensity profile IP(y,z) can also be adjusted during the cleaving process to achieve a desired effect on the resulting rounded outer edge 26R.

In an aspect (1), the disclosure provides a method of cleaving a glass substrate to produce a rounded outer edge, comprising: a) generating first and second Airy beams; b) causing the first and second Airy beams to cross at a crossing point in free space to define a curved intensity profile in the vicinity of the crossing point, wherein the first and second Airy beams respectively have first and second local radii of curvature RA and RB at the crossing point; and c) scanning the curved intensity profile through the glass along a scan path to form a cleaving line that defines rounded outer edge having a radius of curvature RE that is smaller than the first and second local radii of curvature RA and RB. In an aspect (2), the disclosure provides the method according to aspect (1), wherein the first and second Airy beams initially travel along respective first and second axes that define a beam angle θB that is in the range 0.1π radians<θB<π radians. In an aspect (3), the disclosure provide the method according to aspect (1) or aspect (2), wherein the glass substrate includes a central axis that passes through the non-rounded outer edge and the rounded outer edge, and wherein the rounded outer edge is substantially symmetric about the central axis. In an aspect (4), the disclosure provide the method according to any of aspects (1)-(3), wherein RP<(0.8)RA. In an aspect (5), the disclosure provides the method according to any of aspects (1)-(4), wherein the cleaving line is curved. In an aspect (6), the disclosure provides the method according to any of aspects (1)-(5), wherein the rounded outer edge is convex. In an aspect (7), the disclosure provides the method according to any of aspects (1)-(6), wherein the rounded outer edge is concave.

In another aspect (8), the disclosure provides a method of processing a non-rounded outer edge of a glass substrate, comprising: a) generating first and second Airy beams along respective first and second axes that define a beam angle θB that is in the range 0.1π radians<θB<π radians; b) causing the first and second Airy beams to cross at a crossing point in free space to define a curved intensity profile in the vicinity of the crossing point, wherein the first and second Airy beams respectively having first and second local radii of curvature RA and RB at the crossing point; and c) inserting at least a portion of the substantially non-rounded outer edge of the glass substrate into curved intensity profile to form a rounded outer edge over the portion having a radius of curvature RE that is smaller than the first and second local radii of curvature RA and RB. In an aspect (9), the disclosure provides the method of aspect (8), wherein the glass substrate includes a central axis that passes through the non-rounded outer edge and the rounded outer edge, and wherein the rounded outer edge is substantially symmetric about the central axis. In an aspect (10), the disclosure provides the method of aspect (8) or aspect (9), wherein RE<(0.8)RA. In an aspect (11), the disclosure provides the method of any of aspects (8)-(10), wherein RE<(0.5)RA. In an aspect (12), the disclosure provides the method of any of aspects (8)-(11), wherein the non-rounded outer edge is a substantially square edge. In an aspect (13), the disclosure provides the method of any of aspects (8)-(12), wherein the non-rounded outer edge has a length and including scanning the first and second Airy beams over at least a portion of the length so that the rounded outer edge is formed over at least the portion of the length. In an aspect (14), the disclosure provides the method of aspect (13), including scanning the first and second Airy beams over the entire length of the outer edge to form the rounded outer edge over the entire length. In an aspect (5), the disclosure provides the method of aspect (13) or aspect (14), wherein the scanning is accomplished by moving at least one of the first and second Airy beams and the glass substrate. In an aspect (16), the disclosure provides the method of any of aspects (8)-(15), wherein the at least a portion of the rounded outer edge has a bulbous shape. In an aspect (17), the disclosure provides the method of any of aspects (8)-(16), wherein the rounded outer edge has a concave shape.

In an aspect (18), the disclosure provides a system for processing a glass substrate to produce a rounded outer edge, comprising: first and second Airy-beam-forming optical systems that have respective optical axes A1 and A2 and that respectively generate first and second Airy beams; first and second adjustable support devices that operably support the first and second Airy-beam-forming optical systems to define a crossing point in free space where the first and second Airy beams cross and define a curved intensity profile in the vicinity of the crossing point, wherein the first and second Airy beams have respective first and second local radii of curvature RA and RB at the crossing point; a movable stage configured to support the glass substrate relative to the crossing point; and wherein the curved intensity profile has a radius of curvature RP that is smaller than the either of the first and second local radii of curvature RA and RB. In an aspect (19), the disclosure provides the system of aspect (18), wherein the first and second Airy-beam-forming optical systems respectively include first and second axes that cross and define a beam angle θB between the first and second optical axis that is in the range $0.1\pi$ radians<θB<π radians. In an aspect (20), the disclosure provides the system of aspect (18) or aspect (19), wherein the glass substrate has a body and an outer edge and wherein at least one of the first and second adjustable support devices and the movable stage are configured to scan the glass substrate relative to the curved intensity profile so that intensity profile either passes through the glass body or along the outer edge to produce the rounded outer edge. In an aspect (21), the disclosure provides the system of any of aspects (18)-(20), further including the glass substrate. In an aspect (22), the disclosure provides the system of any of aspects (18)-(21), wherein the RA is substantially equal to RB and wherein 10 μm<RA<100 mm, and wherein RP<(0.8)RA.

Experimental Data

In an experiment, a femtosecond laser was employed as the laser source, wherein the femtosecond laser could generate laser pulses having a duration in the range 80 fs to 10 ps. Depending on the cutting speed requires, a typical laser repetition rate for the laser pulses can range from 1 KHz to 1 MHz. In the dual Airy laser beam system 10 disclosed herein, depending on the thickness of the glass substrate, the Airy beams 100A and 100B can each have an energy that ranges from 100 mw to 50 w. The cutting speed can range from 10 μm/s to 2000 mm/s. In an example relating to experiments performed on Corning EagleXG® glass using system 10, a 600 KHz repetition, 300 fs pulse width and 1 w for each Airy beam was used to achieve a 20 mm/s cutting speed.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A method of cleaving a glass substrate, comprising:
   a) generating first and second Airy beams;
   b) causing the first and second Airy beams to cross at a crossing point in free space to define a curved intensity profile in the vicinity of the crossing point, wherein the first and second Airy beams respectively have first and second local radii of curvature RA and RB at the crossing point; and
   c) scanning the curved intensity profile through the glass substrate along a scan path to form a cleaving line that defines a bulbous rounded outer edge of the glass substrate.

2. The method according to claim 1, wherein the first and second Airy beams initially travel along respective first and second axes that define a beam angle θB that is in the range $0.1\pi$ radians<θB<π radians.

3. The method according to claim 1, wherein the glass substrate includes a central axis that passes through the bulbous rounded outer edge, and wherein the bulbous rounded outer edge is substantially symmetric about the central axis.

4. The method according to claim 1, wherein the curved intensity profile defines a local radius of curvature RP, and wherein RP is less than RA and RB.

5. The method according to claim 1, wherein the cleaving line is curved.

6. The method according to claim 1, wherein the bulbous rounded outer edge has a radius of curvature RE that is smaller than the first and second local radii of curvature RA and RB.

7. The method according to claim 1, wherein RA=RB.

8. A method of cleaving a substrate made of glass, comprising:
   a) generating first and second Airy beams;
   b) causing the first and second Airy beams to cross at a crossing point in free space to define a curved intensity profile in the vicinity of the crossing point; and
   c) scanning the curved intensity profile through the glass along a scan path to cause the glass to flow to form a cleaving line having a bulbous rounded outer edge.

9. The method according to claim 8, wherein the substrate comprises a glass sheet having a thickness in the range from 20 μm to 1000 μm.

10. The method according to claim 8, wherein the first and second Airy beams respectively have first and second local radii of curvature RA and RB at the crossing point, and wherein RA=RB.

11. The method according to claim 8, wherein the cleaved line is curved.

* * * * *

UNITED STATES PATENT AND TRADEMARK OFFICE
CERTIFICATE OF CORRECTION

PATENT NO. : 10,494,290 B2
APPLICATION NO. : 15/404677
DATED : December 3, 2019
INVENTOR(S) : Minghan Chen et al.

Page 1 of 1

It is certified that error appears in the above-identified patent and that said Letters Patent is hereby corrected as shown below:

On the Title Page

On page 2, in Column 2, item (56), OTHER PUBLICATIONS, Line 3, delete "Micromachinig" and insert -- Micromachining --, therefor.

On page 2, in Column 2, item (56), OTHER PUBLICATIONS, Line 10, delete "SubstratesA" and insert -- Substrates-A --, therefor.

Signed and Sealed this
Eighteenth Day of February, 2020

Andrei Iancu
*Director of the United States Patent and Trademark Office*